3,367,987
PROCESS FOR PURIFYING AN ALPHA OLEFIN
William L. Walsh, Glenshaw, Pa., assignor to Gulf Research & Development Company, Pittsburgh, Pa., a corporation of Delaware
No Drawing. Continuation-in-part of application Ser. No. 358,933, Apr. 10, 1964. This application Nov. 23, 1966, Ser. No. 596,462
18 Claims. (Cl. 260—677)

This invention relates to a process for purifying a normal alpha olefin having between 6 and 18 carbon atoms per molecule.

This application is a continuation-in-part of my prior co-pending application, Ser. No. 358,933, filed Apr. 10, 1964 and now abandoned.

Ethylene can be polymerized in the presence of a trialkyl aluminum, such as triethyl aluminum, at a temperature of about 140° to about 325° C. and a pressure of about 1000 pounds per square inch gauge to as high as about 1000 atmospheres, or even higher, for about five to about 120 minutes to obtain a mixture containing about 85 to about 95 mol percent of normal alpha olefins, about one to about 10 mol percent of internal straight chain olefins, about one to about 10 mol percent of trisubstituted monoolefins, that is, compounds of the structural formula $R_2C=CHR$, wherein R is an alkyl group, and about one to about 10 mol percent of vinylidenes, that is compounds of the structural formula $R_2C=CH_2$, wherein R is an alkyl group. The olefins so obtained will have predominantly from two to twenty carbon atoms, although lesser amounts of olefins having from 22 to 40 carbon atoms will also be produced.

The mixture defined above can be treated, for example, by distillation, to recover individual normal alpha olefins or fractions containing several individual normal alpha olefins. Unfortunately the other olefins defined above will remain in association with the individual normal alpha olefins or fractions containing the several individual normal alpha olefins. A particularly attractive fraction obtained from the olefin mixture defined above is one containing $C_{12}$, $C_{14}$ and $C_{16}$ normal alpha olefins which can be employed in a reaction with benzene to form a straight chain alkyl benzene which can then be sulfonated, or otherwise treated, to form a highly biodegradable detergent. In such cases in particular, and others as well, the vinylidenes and trisubstituted contaminants are not desirable, since they will react with benzene to form branch chain alkyl benzenes which when sulfonated will form detergents which are not highly biodegradable. By following the procedure defined and claimed herein the total amount of such contaminants associated with the normal alpha olefins is appreciably reduced.

I have discovered that a normal alpha olefin or mixtures of normal alpha olefins admixed with trisubstituted monoolefins and/or vinylidenes of the type defined above and which olefins have between 6 and 18 carbon atoms per molecule can be treated with a Friedel-Crafts catalyst selected from the group consisting of ferric chloride, boron trifluoride and boron trifluoride-etherate in order to reduce the content of said trisubstituted monoolefins and/or vinylidenes. As a result of such treatment I believe a small amount of the normal alpha olefins are isomerized to trans and/or cis internal straight chain olefins, some vinylidenes are isomerized to trisubstituted monoolefins and trisubstituted monoolefins and vinylidenes are polymerized to dimers, trimers and other low molecular weight polymers. In any event the mol percent of the desired normal alpha olefins in the final product will be increased as a result of such treatment, and while in general the mol percent of the trisubstituted monolefins will be increased slightly, the total mol percent of the undesired trisubstituted monoolefins and vinylidenes will be substantially reduced.

The procedure of this invention is applicable to the treatment of mixtures of hydrocarbons consisting essentially of at least one monoolefin and at least one olefin selected from the group consisting of trisubstituted olefins and vinylidenes, said olefins having from 6 to 18 carbon atoms per molecule, preferably from 8 to 16 carbon atoms per molecule, and more preferably 12 to 16 carbon atoms. These mixtures of olefins can suitably come, as noted above, from the polymerization of ethylene using a Ziegler type catalyst system. The olefin charge stocks can also be derived from the cracking of wax or other materials. The trisubstituted and/or vinylidene content of the charge stock can be at any level, but, since these materials are being removed, they are normally present in minor amounts, usually between 0.1 and 20 total weight percent of the charge stock. With charge stocks containing the higher amounts of trisubstituted and/or vinylidene type olefins, several treatments may be required to lower the trisubstituted and/or vinylidene content to the desired level.

Non-reactive diluents, such as paraffins, aromatics and chlorinated hydrocarbons can be present in the charge stocks, but it is preferred that their concentration be as low as possible. Reactive diluents such as alcohols and organic acids should be carefully excluded.

The procedure of this invention resides in contacting a mixture containing at least one normal alpha olefin and at least one trisubstituted olefin and/or at least one vinylidene, said olefins having from 6 to 18 carbon atoms per molecule, under selected reaction conditions with a Friedel-Crafts catalyst selected from the group consisting of ferric chloride, boron trifluoride and boron trifluoride-etherate. While the reaction conditions are not critical they must be closely followed in order to obtain the beneficial results of this invention. Thus, the temperature required can be from about −50° to about 100° C., preferably about 26° to about 100° C. While pressure will have little or no effect when ferric chloride or boron trifluoride-etherate are employed, pressure will increase the reaction rate when boron trifluoride, a gas, is employed. In any event, a pressure of about atmospheric to about 1000 pounds per square inch gauge, or even higher, preferably of about five to about 200 pounds per square inch gauge, is satisfactory. The mixture to be treated and the Friedel-Crafts catalyst employed are maintained in intimate contact with each other for a period which can be, for example, from about 30 seconds to about three hours, preferably from about one minute to about one hour. The amount of Friedel-Crafts catalyst employed can desirably be from about 0.01 to about 20 percent by weight, preferably from about 0.05 to about 10 percent by weight based on the total amount of trisubstituted monoolefins and/or vinylidenes present in the mixture being treated. Obviously, amounts in excess of 20 percent could be employed, if desired, but would not be economical because of increased cost.

Upon completion of the reaction the treated mixture is contacted with at least about 10 percent by weight of an aqueous solution of an inorganic acid, such as hydrochloric acid or sulfuric acid in order to dissolve the Friedel-Crafts catalyst. The aqueous layer containing substantially all of the Friedel-Crafts catalyst is separated from the hydrocarbon layer, and the latter is then washed with about two to about 20 percent by weight of a basic reagent, such as sodium carbonate, calcium carbonate, calcium oxide, etc., to neutralize the acids in said hydrocarbon layer. Although not necessary the washed mixture can be dried by passing the same through molecular sieves, by contacting the same with calcium sulfate or by azeotropic distillation. The resulting mixture can then be distilled at a temperature of about 0° to about 350° C., preferably about 10° to about 300° C., and at a pressure of about atmospheric to about one mm. of mercury, preferably about atmospheric to about 10 mm. of mercury. As a result of the distillation, heavier materials, which are believed to be dimers, trimers and other low molecular weight polymers of the trisubstituted monoolefins and/or vinylidenes, remain behind and the organic fraction containing the normal alpha olefin, internal olefins and trisubstituted monoolefin and/or vinylidene still remaining in association with the normal alpha olefin are removed overhead as desired product.

The process of this invention can further be illustrated by the following.

EXAMPLE 1

Into a three-neck flask equipped with a thermometer and stirrer and which was maintained under a nitrogen atmosphere there was added at a temperature of 25° C. 50.0 grams of a mixture of $C_{12}$ olefins and 0.2 gram of powdered ferric chloride. The mixture was heated to a temperature of 40° C. over a period of about 10 minutes and then maintained at the latter temperature for about 15 minutes. The treated mixture was then washed with 100 milliliters of 3 N hydrochloric acid over a period of 15 minutes. The organic layer that formed was separated from the reaction mixture, washed with two 75-milliliter portions of warm tap water and then with 100 milliliters of dilute cool sodium bicarbonate. Following this the organic layer was washed with distilled water and then dried over anhydrous sodium sulfate. There was thus obtained 48.4 grams of hydrocarbon which was then distilled at 52° to 78° C. at 1.0 to 1.5 millimeter of mercury. The overhead product obtained amounting to about 38 grams was analyzed by infrared. The pot residue amounted to 0.7 grams. The results obtained are tabulated below in Table I.

TABLE I

| Olefin Type | Untreated Sample, Mol Percent | Treated Sample, Mol Percent | Mol per Liter in Treated Sample |
|---|---|---|---|
| (Trans): | | | |
| $RCH=CHR$ | 0.5 | 0.5 | 0.0233 |
| $RCH=CH_2$ | 93.9 | 95.4 | 4.0743 |
| $R_2C=CH_2$ | 3.7 | 1.5 | 0.0622 |
| $R_2C=CHR$ | 0.7 | 0.7 | 0.0664 |
| (Cis) $RCH=CHR$ | 1.2 | 1.2 | 0.0442 |

EXAMPLE 2

Into the same equipment employed in Example 1 there was added 50.0 grams of a mixture of $C_{12}$ olefins and 0.45 gram of 0.45 gram of powdered anhydrous ferric chloride at a temperature of 24.0° C. The temperature rose to 25.0° C. in 10 minutes and rose to 25.5° C. after 15 minutes. After 20 minutes the temperature rose to 25.7° C. and after 30 minutes remained at 25.7° C. Over a period of one hour 100 milliliters of a 3 N solution of hydrogen chloride was added to the reaction mixture. The organic liquid was separated from the reaction mixture, washed with two 75-milliliter portions of warm water and then with two 75-milliliter portions and one 50-milliliter portion of cold dilute sodium bicarbonate. The organic material was then washed with 50 milliliters of distilled water. After drying with anhydrous sodium sulfate the organic layer weighed 49.1 grams. The dried organic layer was distilled at 54° to 78° C. and a pressure of 1.5 millimeter of mercury. The overhead product obtained amounted to about 38 grams and the pot residue 2.3 grams. The overhead product was analyzed by infrared. The results obtained are tabulated below.

TABLE II

| Olefin Type | Untreated Sample, Mol Percent | Treated Sample, Mol Percent | Mol per Liter in Treated Sample |
|---|---|---|---|
| (Trans): | | | |
| $RCH=CHR$ | 0.5 | 0.6 | 0.0257 |
| $RCH=CH_2$ | 93.9 | 96.3 | 4.1262 |
| $R_2C=CH_2$ | 3.7 | 0.7 | 0.0305 |
| $R_2C=CHR$ | 0.7 | 1.2 | 0.0504 |
| (Cis) $RCH=CHR$ | 1.2 | 1.2 | 0.0526 |

EXAMPLE 3

As before, 50.1 grams of $C_{12}$ olefins and 0.82 gram of powdered anhydrous ferric chloride were introduced into the flask at 23.6° C. Fifteen minutes later the temperature rose to 24.0° C. and within 30 minutes to 24.6° C. At the end of one hour, when the temperature had risen to 24.6° C., 100 milliliters of a sodium oxalate solution was added to the reaction mixture. The organic layer was separated from the reaction mixture, washed with a sodium bicarbonate solution, twice with 50-milliliter portions of warm water and then with 50 milliliters of distilled water. Following this the organic layer was dried over sodium sulfate to produce 48.6 grams of product. The dried organic material was distilled at 54° to 84° C. and at a pressure of 1.5 millimeter of mercury. There was recovered overhead about 38 grams of product, leaving behind 0.7 gram of bottoms. The overhead product was analyzed by infrared. The results obtained are tabulated below in Table III.

TABLE III

| Olefin Type | Untreated Sample, Mol Percent | Treated Sample, Mol Percent | Mol per Liter in Treated Sample |
|---|---|---|---|
| (Trans): | | | |
| $RCH=CHR$ | 0.5 | 0.5 | 0.0215 |
| $RCH=CH_2$ | 93.9 | 97.1 | 4.2261 |
| $R_2C=CH_2$ | 3.7 | 0.4 | 0.0183 |
| $R_2C=CHR$ | 0.7 | 1.1 | 0.0459 |
| (Cis) $RCH=CHR$ | 1.2 | 1.0 | 0.0418 |

EXAMPLE 4

Again 50.0 grams of $C_{12}$ olefins and 0.84 gram of powdered anhydrous ferric chloride were added to the flask at 25° C. During the most of the 60-minute reaction period the temperature was maintained at 25° C. At this point 100 milliliters of a 3 N hydrochloric acid solution was added to the reaction mixture. After 15 minutes the aqueous layer was separated from the hydrocarbon layer, and the latter was then washed with two 75-milliliter portions of a dilute sodium bicarbonate solution, two 75-milliliter portions of warm water and one 75-milliliter portion of distilled water. The hydrocarbon layer was dried over sodium sulfate and was found to weigh 46.9 grams. The hydrocarbon layer was distilled at a temperature of 40° to 70° C., at 5 millimeters of mercury. There was recovered overhead about 38 grams of product, leaving behind 2.4 grams of pot residue. The overhead product was analyzed by infrared, and the results obtained are tabulated below in Table IV.

TABLE IV

| Olefin Type | Untreated Sample, Mol Percent | Treated Sample, Mol Percent | Mol per Liter in Treated Sample |
|---|---|---|---|
| (Trans): | | | |
| RCH=CHR | 0.5 | 0.6 | 0.0248 |
| RCH=CH$_2$ | 93.9 | 97.2 | 4.1742 |
| R$_2$C=CH$_2$ | 3.7 | 0.5 | 0.0204 |
| R$_2$C=CHR | 0.7 | 0.9 | 0.0399 |
| (Cis) RCH=CHR | 1.2 | 0.9 | 0.0367 |

EXAMPLE 5

The same procedure described above was carried out with boron trifluoride. A trace amount (believed to be about 0.01 gram) of gaseous boron trifluoride was added to 50 grams of C$_{12}$ olefins at 25° C. The mixture was maintained at this temperature for one hour and then washed with about 75 milliliters of a sodium bicarbonate solution and several times with water. The hydrocarbon layer that was recovered, which amounted to 50.0 grams, was distilled at 55° to 80° C. at one millimeter of mercury. Overhead there was recovered about 38 grams of product; there was 1.2 grams of residue. The overhead was analyzed by infrared. The results obtained are tabulated below in Table V.

TABLE V

| Olefin Type | Untreated Sample, Mol Percent | Treated Sample, Mol Percent |
|---|---|---|
| (Trans): | | |
| RCH=CHR | 0.6 | 0.8 |
| RCH=CH$_2$ | 91.6 | 93.5 |
| R$_2$C=CH$_2$ | 5.6 | 1.0 |
| R$_2$C=CHR | 1.4 | 3.3 |
| (Cis) RCH=CHR | 0.9 | 1.3 |

EXAMPLE 6

The procedure of Example 5 was repeated except that 0.1 gram of gaseous boron trifluoride was employed with 50 grams of C$_{12}$ olefins, and the temperature during the reaction was maintained at 24.5° C. The hydrocarbon layer recovered, amounting to 49.5 grams, was distilled at 55° to 80° C. and at one millimeter of mercury. Overhead there was recovered about 38 grams of product. The residue amounted to 6.7 grams. The overhead was analyzed by infrared, and the results are tabulated below in Table VI.

TABLE VI

| Olefin Type | Untreated Sample, Mol Percent | Treated Sample, Mol Percent |
|---|---|---|
| (Trans): | | |
| RCH=CHR | 0.6 | 3.2 |
| RCH=CH$_2$ | 91.6 | 91.7 |
| R$_2$C=CH$_2$ | 5.6 | 0.8 |
| R$_2$C=CHR | 1.4 | 1.2 |
| (Cis) RCH=CHR | 0.9 | 0.9 |

EXAMPLE 7

The procedure of Example 6 was repeated using 0.1 gram of boron trifluoride-etherate and 50.0 grams of C$_{12}$ olefins. The hydrocarbon layer recovered, amounting to 49.5 grams, was distilled at 55° to 80° C. and at one millimeter of mercury. Overhead there was recovered about 38 grams of product, while the residue amounted to 0.6 gram. The overhead was analyzed by infrared and the results are tabulated below in Table VII.

TABLE VII

| Olefin Type | Untreated Sample, Mol Percent | Treated Sample, Mol Percent |
|---|---|---|
| (Trans): | | |
| RCH=CHR | 0.5 | 0.4 |
| RCH=CH$_2$ | 92.8 | 94.0 |
| R$_2$C=CH$_2$ | 5.5 | 3.5 |
| R$_2$C=CHR | 0.3 | 1.6 |
| (Cis) RCH=CHR | 0.9 | 0.5 |

A study of the data in Tables I through VII shows that by treating the defined mixtures in accordance with the dictates of this invention, the resulting mixture will contain a higher mol percent of desired normal alpha olefins and a lower total mol percent of trisubstituted and vinylidene-type olefins.

EXAMPLE 8

Into a 75-cc. flask equipped with a thermometer and magnetic stirrer was added 60 grams of butene-1, 60 grams of isobutylene and a small amount (0.1 percent weight percent) of anhydrous AlCl$_3$ at −40° C. The mixture was stirred for one hour and 25 minutes during which time a polymer phase was observed to form. The polymer was separated and found to weigh 91.5 grams. Only butene-1 could be detected in the unreacted 28.5 grams of material recovered. This result indicates that 31.5 grams of butene-1 was contained in the polymer along with the 60.0 grams of isobutylene.

Example 8 shows that AlCl$_3$ even in very small concentrations is unsuitable for the separation of isobutylene from admixture with butene-1 when the charge stock contains only olefins.

EXAMPLE 9

The procedure of Example 8 was repeated except the charge stock was 66.8 grams of hexene-1 and 68.2 grams of 2-methyl pentene-1. There was no reaction.

EXAMPLE 10

Example 9 was repeated except 127 grams of hexene-1 and 6.7 grams of 2-methyl pentene-1 was the charge and the temperature was 33° C. After one hour there was no reaction. Upon the addition of 2.1 percent AlCl$_3$, an exothermic reaction occurred and the temperature increased first to 70° and then 109° C. and a heavy polymer was formed.

A comparison of Examples 8–10 shows that AlCl$_3$ is unsuitable for the treatment of C$_4$, C$_5$ and C$_6$ olefins to achieve the purpose of this invention. I have also found AlCl$_3$ to be unsuitable for the treatment of C$_{12}$ olefins for the intended purpose.

EXAMPLE 11

The first part of Example 10 was repeated except only 72.4 grams of hexene-1 and 3.8 grams of 2-methyl pentene-1 were employed and the AlCl$_3$ was replaced with 1.0 grams of FeCl$_3$. After one hour and 30 minutes at 25° C., analysis showed the removal of 55 percent of the 2-methyl pentene-1 while the hexene-1 remained unreacted.

A comparison of Examples 10 and 11 shows that AlCl$_3$ remains unsuitable for reacting with C$_6$ olefin streams to achieve the intended purpose while FeCl$_3$ is suitable.

A series of four runs was made using FeCl$_3$ and a 42-gram mixture of hexane; hexene-1 and 2-methyl-pentene-1 where the amount of hexane and hexene-1 was varied to determine the effect of the presence of paraffins on the removal of 2-methyl pentene-1. The runs were made in the same equipment as Example 8. The reaction temperature in all four runs was 26° C. and the reaction time was one hour. The amount of FeCl$_3$ was 0.04 grams in all four runs. The exact amounts of materials, the percent of paraffins and olefins, along with the percent removal of 2-methyl pentene-1 is given in Table VIII below.

TABLE VIII

| Example No. | Hexane | Grams of hexene-1 | 2-methyl pentene-1 | Hexane | Wt. Percent hexene-1 | 2-methyl pentene-1 | Percent Removal 2-methyl pentene-1 |
|---|---|---|---|---|---|---|---|
| 11 | 8 | 32 | 2 | 18.5 | 78.5 | 5 | 30 |
| 12 | 16 | 24 | 2 | 37.5 | 57.5 | 5 | 19 |
| 13 | 24 | 16 | 2 | 57.5 | 37.5 | 5 | 20 |
| 14 | 32 | 8 | 2 | 78.5 | 18.5 | 5 | 12 |

Referring to Table VIII, it can be seen that although the percent 2-methyl pentene-1 was constant for all four runs (5 percent), the percent removal of 2-methyl pentene-1 was significantly greater for the charge stocks containing the smaller concentration of paraffins. It is therefore preferred to have the paraffin content of the charge stock as low as possible.

It is critical that the Friedel-Crafts catalyst employed herein be selected from the group consisting of ferric chloride, boron trifluoride and boron trifluoride-etherate. I have employed ferric chloride hydrate, hydrogen chloride, titanium tetrachloride, anhydrous aluminum chloride, anhydrous zinc chloride and boron trichloride in place of anhydrous ferric chloride, boron trifluoride and boron trifluoride-etherate and found the same to be ineffective for the defined purpose. Thus, ferric chloride hydrate and hydrogen chloride reduced the mol percent of normal alpha olefins and increased the total mol percent of the substituted olefins in the treated mixture. The use of titanium tetrachloride reduced the mol percent of normal alpha olefin, while the total mol percent of the substituted olefins remained about the same. Anhydrous aluminum chloride did not alter the mol percent of either the normal alpha olefins nor of the substituted olefins and, indeed, resulted in polymerization in some cases, as noted above. Anhydrous zinc chloride reduced the mol percent of normal alpha olefins, but did not alter the total mol percent of the substituted olefins. Boron trichloride also reduced the mol percent of normal alpha olefins, but reduced slightly the total mol percent of substituted olefins in the treated mixture.

Obviously, many modifications and variations of the invention, as hereinabove set forth, can be made without departing from the spirit and scope thereof, and therefore only such limitations should be imposed as are indicated in the appended claims.

I claim:
1. A process which comprises:
  contacting a mixture consisting essentially of hydrocarbons, said mixture containing predominantly at least one normal alphaolefin and lesser amounts of at least one vinylidenes type olefin, the number of carbon atoms in said olefins being from 6 to 18;
  with a Friedel-Crafts catalyst selected from the group consisting of ferric chloride, boron trifluoride and boron trifluoride-etherate;
  under conditions including a temperature between about −50° C. to about 100° C. to selectively polymerize said vinylidene type olefins.
2. A process according to claim 1 wherein the Friedel-Crafts catalyst is ferric chloride.
3. A process according to claim 1 wherein the Friedel-Crafts catalyst is boron trifluoride.
4. A process according to claim 1 wherein the Friedel-Crafts catalyst is boron trifluoride-etherate.
5. A process according to claim 1 wherein the number of carbon atoms in said olefins is from 8 to 16.
6. A process according to claim 1 wherein the amount of Friedel-Crafts catalyst is about 0.01 to about 20 percent by weight of said substituted olefins.
7. A process according to claim 6 wherein the Friedel-Crafts catalyst is ferric chloride.
8. A process according to claim 6 wherein the Friedel-Crafts catalyst is boron trifluoride.
9. A process according to claim 6 wherein the Friedel-Crafts catalyst is boron trifluoride-etherate.
10. A process according to claim 6 and thereafter subjecting the organic portion of the resulting product to distillation to recover a product boiling in substantially the same range as the charge stock and containing lesser amounts of said substituted olefins.
11. A process according to claim 10 wherein the Friedel-Crafts catalyst is ferric chloride.
12. A process according to claim 10 wherein the Friedel-Crafts catalyst is boron trifluoride.
13. A process according to claim 10 wherein the Friedel-Crafts catalyst is boron-trifluoride-etherate.
14. A process according to claim 5 wherein the amount of Friedel-Crafts catalyst is about 0.01 to about 20 percent by weight of the substituted olefins.
15. A process according to claim 5 wherein the catalyst is ferric chloride.
16. A process according to claim 5 wherein the Friedel-Crafts catalyst is boron trifluoride.
17. A process according to claim 5 wherein the Friedel-Crafts catalyst is boron trifluoride-etherate.
18. A process according to claim 14 and thereafter subjecting the organic portion of the resulting product to distillation to recover a product boiling in substantially the same range as the charge stock but containing lesser amounts of said substituted olefins.

References Cited
UNITED STATES PATENTS 2,469,725 3/1949 Heinrich _____ 260—683.15
2,631,176 3/1953 Heinrich _____ 260—683.15
2,588,425 3/1952 Stevens _____ 260—683.15
2,065,540 12/1936 Schneider _____ 260—106
2,657,246 10/1953 Schneider _____ 260—683.15

DELBERT E. GANTZ, *Primary Examiner.*

J. D. MYERS, *Assistant Examiner.*